(12) United States Patent
Elliott et al.

(10) Patent No.: US 8,806,544 B1
(45) Date of Patent: Aug. 12, 2014

(54) CONTENT SYNCHRONIZATION

(71) Applicant: Cable Television Laboratories, Inc., Louisville, CO (US)

(72) Inventors: Isaac Elliott, Broomfield, CO (US); Steve Glennon, Lafayette, CO (US); Deborah Fitzgerald, Superior, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 13/755,254

(22) Filed: Jan. 31, 2013

(51) Int. Cl.
H04N 7/18 (2006.01)
H04N 21/242 (2011.01)
H04N 21/2387 (2011.01)

(52) U.S. Cl.
CPC ......... H04N 21/242 (2013.01); H04N 21/2387 (2013.01)
USPC .............................................. 725/81; 725/97

(58) Field of Classification Search
CPC .................................................. H04N 21/242
USPC ................................................ 725/80, 141, 94
See application file for complete search history.

(56) References Cited

U.S. PATENT DOCUMENTS

| 2002/0046404 | A1* | 4/2002 | Mizutani | 725/58 |
| 2010/0281108 | A1* | 11/2010 | Cohen | 709/203 |
| 2013/0198772 | A1* | 8/2013 | Wang et al. | 725/32 |
| 2013/0331972 | A1* | 12/2013 | Sagne et al. | 700/94 |

* cited by examiner

Primary Examiner — Mark D Featherstone
Assistant Examiner — Tien Michael Nguyen
(74) Attorney, Agent, or Firm — Great Lakes Intellectual Property, PLLC.

(57) ABSTRACT

Synchronization of content, events and other executables is contemplated. The synchronization may include synchronizing events executing on one device relative to events executing on another device, such as to facilitate syncing an interactive application executing on a tablet computer or other mobile device to a television program or other content interfaced through a television or other interface.

17 Claims, 3 Drawing Sheets

CONTENT SYNCHRONIZATION

TECHNICAL FIELD

The present invention relates to synchronization, such as but not necessarily limited to synchronizing content interfaced through a first device with content interfaced through a second device.

BACKGROUND

Synchronization relates to establishing a temporal relationship between two or more devices such that the timing of events at one device can be scheduled or coordinated with the same or different events occurring at another one or more devices. One type of synchronization relies on independent clocks included at each device to time pre-programmed events to commonly execute at pre-scheduled times. This type of synchronization may rely upon a clocking message or other type of synchronization signal to be periodically communicated to each device in order to maintain a common time reference between each of the clocks, and thereby, synchronized execution of the desired events. The synchronization provided by merely coordinating device clocks relative to a common time reference may not be sufficient when events are to be synchronized relative to a time reference independent of such clocks. The synchronization of content requires synchronization where the timing is based on a timeline that varies as a function of variances associated with transport of the content to the one or more devices desiring synchronization.

The synchronization of content can be particularly problematic when the content is broadcasted, multicasted or otherwise commonly transported to a plurality of primary devices as the primary devices may process the content for output at different speeds and/or the transport time at which the content is delivered to the primary devices may vary depending on the transmission medium, network congestion or other influences. If one or more of the primary devices is associated with a secondary device, such as a tablet computer, mobile phone etc., it can be desirable to coordinate activities of the secondary device relative to the content interfaced through the one or more of the primary devices. Synchronizing the primary devices and the secondary devices by setting their clocks to a common time reference may not provide sufficient synchronization since the content timing is unique to each primary device and independent of the clock timing. Accordingly, a need exists to facilitate content synchronization where events or other operations occurring at a secondary device may be timed relative to content interfaced through a primary device in a manner that compensates for variances at which the corresponding primary device interfaces the content.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
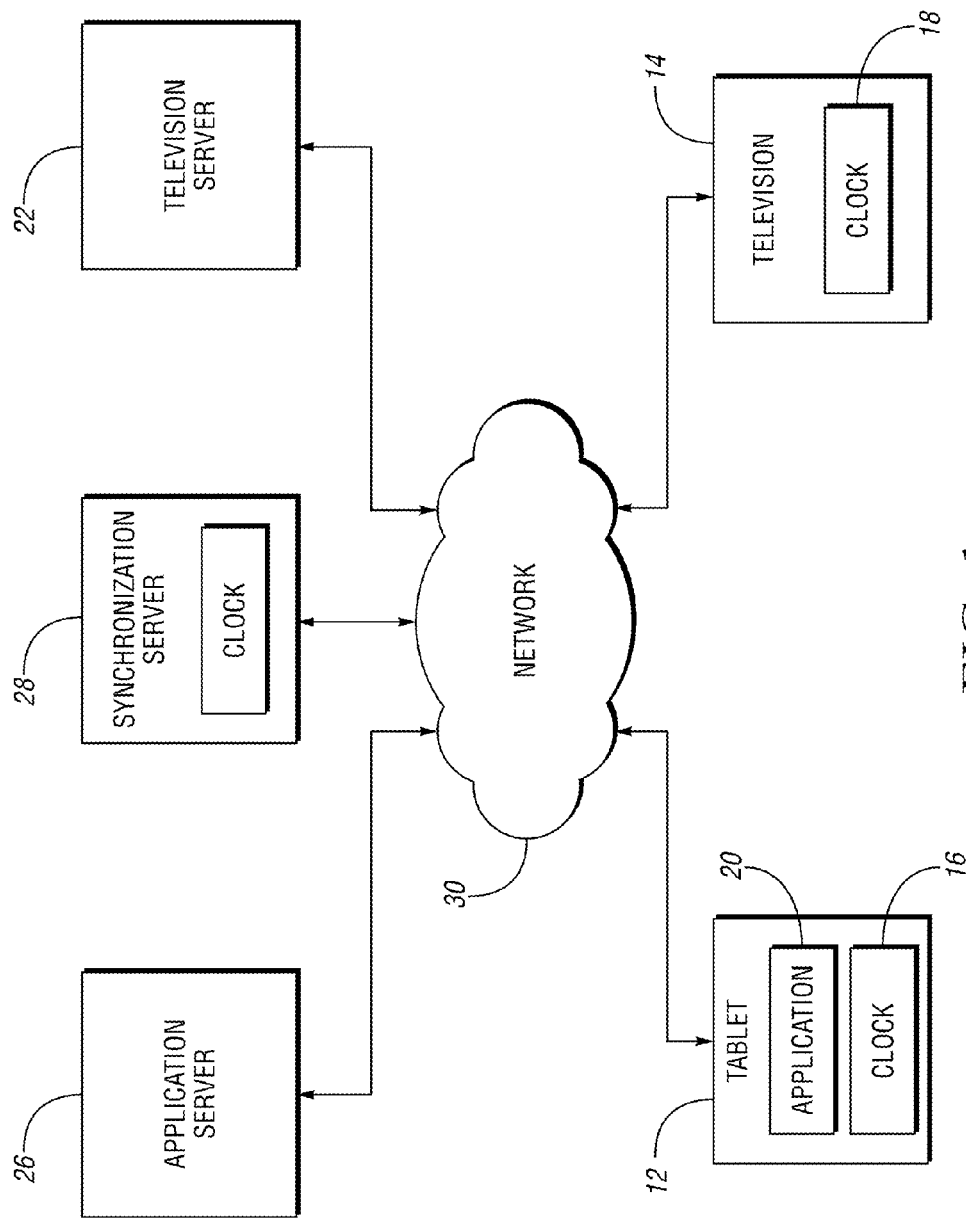
FIG. 1 illustrates a synchronization system in accordance with one non-limiting aspect of the present invention.

FIG. 1 illustrates a synchronization system 10 in accordance with one non-limiting aspect of the present invention. The synchronization system 10 is described with respect to synchronizing events interfaced through a tablet 12 relative to content interface through a television 14. This description is provided for exemplary non-limiting purposes to demonstrate one environment where content at a primary device (television 14) is to be synchronized relative to content and/or events at a secondary device (tablet 12). This environment may require more synchronization than that which can be provided by maintaining a common timing between a device clock 16 and a television clock 18 operating at the device 12 and the television 14 due to timing variances associated with the content interfaced through the television 14. In particular, the present invention may be beneficial in facilitating execution of an application 20 at the tablet 12 relative to timing or events associated with certain portions of the content interfaced through the television 14, particularly when timing of the content may vary depending on transmission or device processing variances.

While the system 10 is predominately described with respect to synchronization between the tablet 12 and the television 14, the present invention is not necessarily so limited and fully contemplates synchronization between various types of devices. In particular, the capabilities, operations, processes and functions described with respect to the tablet 12 and/or the television 14 may be similarly executed or facilitated with other types of devices, such as but not necessarily limited to a mobile phone, a computer, a set top box (STB), a gateway, a router, a terminal, a movie theater projector/player or other type of device where events, processes, operations or other features at one device are to be timed relative to content showing, played, accessed, output or otherwise interfaced through another device. The exemplary description is provided with respect to the content being associated with television or other programming delivered from a multiple system operator (MSO), a cable/satellite/broadcast television service provider, a high-speed data service provider, an Internet service provider (ISP), a voice over Internet protocol (VoIP) service provider, a cellular data/phone service provider and the like where time varying content may be provided to the television 14 or other type of primary device and additional synchronization with the tablet 12 or other secondary device may be desirable.

The content is shown to be sourced to the television 14 from a television server 22. The television server 22 may be a headend) or any other type of device having capabilities sufficient to facilitate transporting or otherwise delivering content to the television 14. The television server 22 is shown to facilitate transport of content to a single television 14 for exemplary non-limiting purposes as the present invention fully contemplates the television server 22 being configured to facilitate simultaneously broadcasting or otherwise transmitting the same content to multiple televisions 14 at the same time. The content sourced from the television server 22 may be television related content transmitted in real-time through a linear transmission and/or transmitted on demand through a non-linear transmission. The television related content may be that sufficient for interfacing through the television 14, such as but not necessary limited to a television program, a movie, an audio track, a Web page, etc. While television content is predominately described, the present invention is not necessarily so limited and fully contemplates its use and application in synchronizing other types of content, including that associated with data, cellular phone usage, non-broadcasted/transmitted content, e.g., video-on-demand (VOD) and network digital video recorder (DVR), and content dependent applications (phone applications, etc.).

The system 10 may include an application server 26 configured to provide application events to the tablet 12. The application events may operate with the application 20 of the tablet 12 to facilitate executing the application events relative to content interfaced through the television 14. The application 20 may include a synchronization process or algorithm to facilitate synchronizing execution of the application events relative to a time offset. The time offset may be generated by the application 20 and/or a synchronization server 28 to reflect a timing difference so that the application events execute in concert with or during a desirable portion of the content interfaced through the television 14. The application server 20 may specify a plurality of application events to be interfaced through the tablet 12 at particular intervals of the content, such as to provide secondary information for player or team statistics, products, actors and locations shown at different portions of a television program. The secondary information may include information for ordering products, statistics on sports players, factual background on locations and virtually any other type of information relevant to the content.

The application events may be characterized as executable operations performed at the tablet 12 to enhance a user experience with the content interfaced through the television 14. One non-limiting aspect of the present invention contemplates synchronizing execution of the application events relative to the content within at least 100 ms of each other. The ability to synchronize the application events with the content may be beneficial when a user of the tablet 12 is in close proximity to the television 14, such as but not necessarily limited to while the user is watching the television 14 and using the tablet 12 as an auxiliary controller (remote control) for the television 14 and/or a source for supplemental information. The tablet 12 may be configured to receive user inputs and to provide responsive audio and/or visual stimulation to the user. The tablet 12 may include an operating system, a processor, a computer-readable medium, and other features necessary to facilitate executing or directing the execution of the operations contemplated by the present invention to facilitate execution of the application events and synchronization of the application events or other events of the tablet relative to content interfaced through the television.

The synchronization server 28 is configured to facilitate the contemplated synchronization. The synchronization server 28 may be configured to tune or otherwise monitor content transmitted from the television server 22 for comparison with information collected by the tablet 12 in order to facilitate synchronizing the tablet 12 relative to the television 14. The synchronization server 28, the application server 26 and the television server 22 may communicate with a wide area network 30 that in turn communicates with a local area network 32 to facilitate communications with the tablet 12 and the television 14. The wide area network 30 may correspond with the Internet or a proprietary communication medium associated with a service provider of the television server 22 and the local area network 32 may correspond with a home network or other local network supported at a home of the subscribers associated with the television 14. The television server 22, the synchronization server 28 and the application server 26 may be configured to communicate with the tablet 12 and/or the television 14 through the wide area network 30 and independently of the synchronization server 28 such that anyone of application server 26, synchronization server 28 and the television server 22 may communicate directly with the tablet 12 and/or the television 14 without having to route related signaling through the synchronization server 28.

The synchronization contemplated by one non-limiting aspect of the present invention may be facilitated by the tablet 12 generating television audio samples and the synchronization server 28 generating server audio samples. The tablet audio samples may correspond with the tablet 12 capturing audio associated with content emitted from the television 14. This may require the tablet 12 to be positioned within an audible range or a surrounding area of the television 14 and/or otherwise configured to receive audio representations of the content as emitted from the television 14. The television audio samples may be useful in identifying when content is actually output from the television 14 to an area proximate to the tablet. Because the content outputted from the television 14 and other devices receiving the same content transmission may vary from device to device, the television audio samples or audio samples taken at the other devices may be used to quantify timing differences at which the same content is being output at different locations. The server audio samples may provide a similar temporal reference with respect to the content as emitted or transmitted from the television server 22 for use with the television 14. The synchronization server 22 may be configured to tune to a broadcast, transport stream or other transmission of the content in order to generate the server audio samples.

Figures 2, 3:
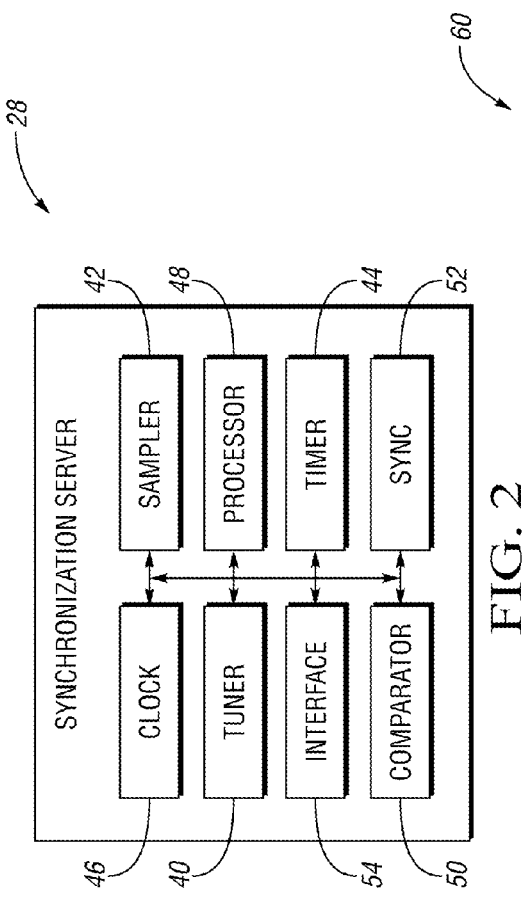
FIG. 2 illustrates an exemplary configuration of the synchronization server in accordance with one non-limiting aspect of the present invention.
FIG. 3 illustrates a timecode chart in accordance with one non-limiting aspect of the present invention.

FIG. 2 illustrates an exemplary configuration of the synchronization server 28 in accordance with one non-limiting aspect of the present invention. The synchronization server 28 may include a tuner 40 configured to tune to the content as emitted from the television server 22 for use with the television 14. The tuner 40 may be configured to tune to or otherwise facilitate access to various types of signaling, including but not limited to radio frequency (RF), Quadrature Amplitude Multiplex (QAM), Internet protocol (IP) streaming, cellular transmissions, multicast groups and other types signaling. While the synchronization server 28 is shown for exemplary purposes to be connected remotely from the television 14, the synchronization server 28 may be positioned elsewhere and/or included as part of another device. The signaling tuned to by the tuner 40 may be an intercept of the same signaling received by the television 14 and/or it may be related signaling transmitted at the same time from the television server 22 (e.g., the television server 22 may transmit the content at the same time over multiple television channels or frequencies to different geographical areas such that the synchronization server 28 may tune to a different television channel or transport stream than that which is actually tuned to by the television 14). The synchronization server 28 may include a sampler 42 configured to generate the server audio samples from the tuned to signaling.

The sampler 42 may be configured to generate server audio samples of variable length and/or duration. The server audio samples may be renderings of the actual audio and/or some other representation, such as a derivative of the related audio stream, which may include an amplitude signature, frequency vectors, watermarks or fingerprints. The sampler 42 may be configured to periodically generate the server audio samples at predefined or dynamically determined intervals, which may vary according to a length of the tuned to content and/or instructions provided from the tablet 12 (e.g., less samples may be required once the tablet 12 is synchronized than when the tablet 12 is attempting to synchronize). The synchronization server 28 may include a timer 44 configured to generate timecodes for each of the server audio samples. The timecodes may represent a time coinciding with capturing/recovery of the corresponding server audio sample. The time may be determined from a server clock 46 or other timing element included within or accessible by synchronization server 28. The synchronization server 28 may include a processor 48 and/or a computer-readable medium having instructions stored therein sufficient to facilitate coordinating operation of the synchronization server 28 to facilitate generating the server audio samples, timecodes, and perform other operations contemplated by the present invention.

A comparator 50 of the synchronization server 28 may be configured to compare one or more server audio samples to one or more television audio samples received from the tablet 12. The comparator 50 may determine a matched sample to correspond with the one of the one or more server audio samples most closely matching with the television audio sample. The comparator 50 may include a database (not shown) or other history of server audio samples generated over time and/or the database may be generated anew each time a new content stream or other transmission medium of the television server 28 is tuned to with the tuner 40. To conserve memory and other processing demands, it may be beneficial to determine the audio samples anew each time synchronization is desired rather than saving the audio samples prior to transmission and/or rather than saving audio samples for an indeterminate period of time after transmission. In the event the television supports trick mode or other modes of operation where the content may be paused, saved or otherwise processed for non-real-time playback or other time delayed playback, the comparator 50 may at least temporarily store server audio samples for the corresponding content, at least until the trick mode ceases. Similarly, in the event that the program distributed from the television server 22 is saved and available for on-demand playback, the comparator 50 may store server audio samples for the corresponding content until the program is no longer available for on-demand playback.

A synchronization controller 52 of the synchronization server 28 may be configured to facilitate processing messages and other signaling interfaced with the tablet 12. The synchronization controller 52 may identify the channel or other transport stream from which the server audio samples are to be captured based on messages received from the tablet 12 and/or the television 14 or other entity with knowledge of a channel or other identifier of the content output from the television 14. The content being emitted from the television 14 may be identified according to a channel number, title, description or other indicator that the synchronization controller 52 can rely upon to facilitate directing the tuner 40 to tune to the corresponding transmission from the television server 22. The synchronization controller 52 may be configured to determine a timecode registered by the tablet 12 when capturing the television audio sample. The tablet/device timecode may be used for comparison with the timecode registered by the synchronization server 28 when capturing the matched audio sample to determine the time offset. The synchronization controller 52 may calculate the time offset to equal the difference between the television audio sample timecode and the server audio sample timecode, and thereby, to represent a timing difference between when the content is emitted from the television server 22 relative to when the content is emitted from the television 14.

A timing message or other indicator of the time offset may be transmitted through an interface 54 from the synchronization server 28 to the tablet 12. The application executing on the tablet 12 may process the time offset to facilitate synchronizing execution of the application events relative to the content as interfaced through the television 14. Each of the application events to be executed within the application 20 may be associated with an event time specified by the application server 26 relative to transmission of the corresponding content from the television server 22. The application 20 may be configured to adjust the event time according to the time offset in order to ensure the corresponding application events are properly synchronized with the content interfaced through the television 14. The event time may be adjusted by increasing or decreasing the event time relative to the time offset such that the corresponding application event executes before, at and/or after the event time originally specified by the application server 26. In this manner, the application server 26 can provide a common set of application events to a plurality of tablets 12 or other secondary devices (i.e., the event time is the same for each device receiving same application events) whereby the secondary devices 12 can then adjust the event times according to individually determined time offsets to ensure the application events properly synchronize to the variances of the corresponding primary devices 14. Optionally, the synchronization server 28 may be configured to simultaneously support synchronization in a similar manner for multiple devices located at other locations.

FIG. 3 illustrates a timecode chart 60 in accordance with one non-limiting aspect of the present invention. The timecode chart 60 may be generated by the comparator 50 and/or other feature of the synchronization server 28 and/or the tablet 12 to facilitate tracking the time offset. The chart 60 includes a first column 62 indicating server sample IDs for the server audio samples captured with the synchronization server 28, a second column 64 indicating timecodes for each of the server audio samples, a third column 66 identifying a matched ID for the matched audio samples, a fourth column 68 indicating timecodes for each of the television audio samples as determined by the tablet 12, and a fifth column 70 indicating time offsets corresponding with timing differences between when the server 28 and the tablet 12 captured matching audio samples. The application events specified by the application server 26 may include similar nomenclature for identifying particular application events and the event times at which each event are to execute. The time offset may be added to the event times to synchronize execution, which for the example in FIG. 3 would include adding 3.04 seconds to the event time specified for each application event such that each application event executes 3.04 seconds later than that specified by the application server.

Figure 4:
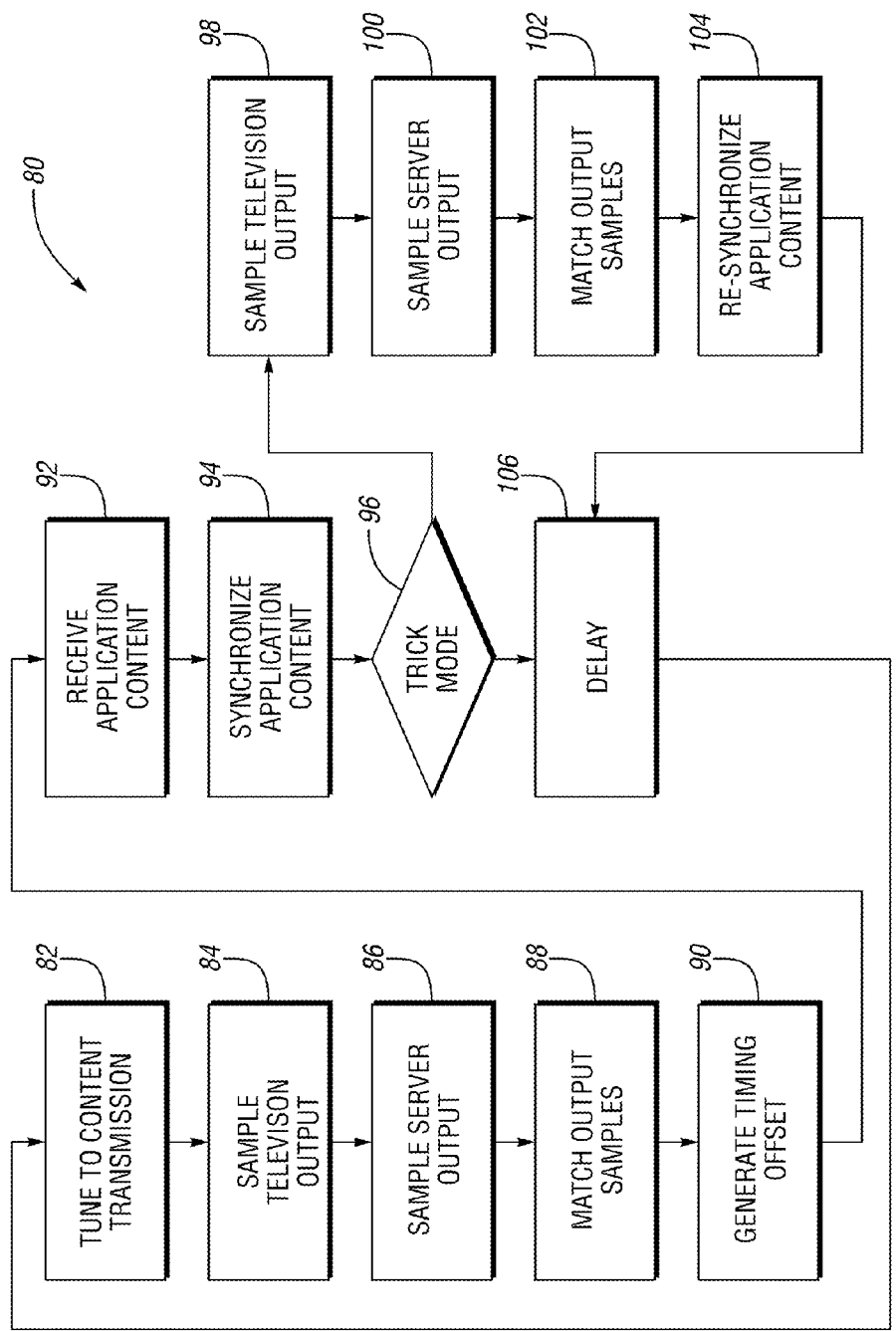
FIG. 4 illustrates a flowchart for a method of content synchronization contemplated by one non-limiting aspect of the present invention.

FIG. 4 illustrates a flowchart 80 for a method of content synchronization contemplated by one non-limiting aspect of the present invention. The method may be embodied in a computer-readable medium or computer product having non-transitory instructions which when operated in cooperation with a processor or other suitable processing device facilitates content synchronization. The method of synchronization is predominately described with respect to synchronizing application events executing on a secondary device, such as tablet 12, relative to content interfaced through a primary device, such as a television 14. Like the description above, the description of the synchronization method is described with respect to synchronizing television content for exemplary non-limiting purposes as the present invention fully contemplates synchronizing other types of content and synchronizing the content using other types of devices and communication mediums besides those described with respect to the tablet 12 and the television 14. The method of synchronization may apply to any environment when synchronization is based on timing difference between content output and content transmission.

Block 82 relates to the synchronization sever 28 tuning to the content transmission identified by the application 20. The application 20, an STB and/or other content receiver may transmit an identification message having the identifier to the synchronization server 28 for this purpose. Optionally, the identification message may include the television audio sample, which may be recognized by the synchronization server 28 to determine the appropriate content transmission. The content transmission may be tuned to at a location local to the television 14, i.e., after being transmitted to the television 14 but prior to output and/or at a location remote to the television 14, such as by intercepting the transport stream to the television 14 or another transport stream other than the transport stream received by the television 14. The synchronization server 28 tuning may be done in real-time or close to the capturing of the television audio samples in order to maximize the speed at which the tablet 12 may be synchronize with the television 14.

Block 84 relates to sampling a television output or other content interfaced through the television as a function of received signals. The television output may be audio, images, files, data or other measures generated by the television 14 in response to signals received from the television server 22 or other entity providing content for synchronization. One non-limiting aspect of the present invention contemplates the television output being sampled as television audio samples captured with a microphone positioned within an audible range of the television 14 to reflect audio as emitted from the television. The television audio samples may be automatically generated in response to a user actuating the application 20 on the tablet 12 designed to execute application events at certain event times. The television audio samples may be in the form of actual audio files and/or derivatives thereof. The application 20 may be configured to associate a timecode with each television audio sample as measured from the device clock 16 of the tablet 12 at the time of capturing. The application 20 may also be configured to identify the content being captured, such as from a user input of television channel, program name or the like.

Block 86 relates to the synchronization server 28 sampling a server output or other content interfaced thought the television 14 as a function of signals emitted from the television server for use with the television. The sampled server output may correspond with the audio, images, files, data or other measures used to generate the television output, which for exemplary purposes is described with respect to being audio referred to as server audio samples. The synchronization server 28 may be configured to collect a plurality of server audio samples, optionally with some of the server audio samples including overlapping audio, in order to maximize the possibility of one of the server audio samples matching the television audio sample. The server audio samples may be automatically generated in response to the identification message received from the application 20. The server audio samples may be in the form of actual audio files and/or derivatives thereof, depending on the form used by the application. The synchronization server 28 may be configured to associate a timecode with each server audio sample as measured from the server clock 46 at the time of capturing.

Block 88 relates to comparing the television audio sample to the one or more server audio samples to determine a matched audio sample. The system 10 described above with respect to FIG. 1 predominately related to the synchronization server 28 being configured to compare the television and server audio samples to determine the matched audio sample. The present invention is not so limited and fully contemplates the tablet 12 performing the comparison, such as by the synchronization server 28 transmitting one or more of the server audio samples, or a portion of the server audio samples likely to be matching candidates, to the tablet 12 for further comparison in determining the matched audio sample. The matched audio sample may correspond with the one of the server audio samples most similarly matching to the television audio sample. The matching may be performed by comparing audio tracks of each of the television and server samples to each other, comparing a derivative or otherwise assessing the commonality of each audio sample.

Block 90 relates to generating a time offset reflective of a timing difference between timecodes associated with the television audio sample and the matched audio sample, i.e., the one of the one or more server audio samples matching the television audio sample. The time offset may be generated by either one of the tablet 12 and the synchronization server 28. The tablet 12 may generate the time offset based on comparing a device timecode for the television audio sample to a server timecode for the matched audio sample, which may be provided by the synchronization server 28 to the tablet 12. The tablet 12 may generate the time offset with or without performing the matching. If the tablet 12 performs the matching, the application 20 may be configured to compare the server timecodes transmitted with each of the one or more server audio samples. If the synchronization server 28 performs the matching, the synchronization server 28 may generate the time offset based on the device timecode received from the tablet 12 with the television audio sample and/or the synchronization server 28 may transmit a server timecode reflective of the timecode for the matched audio sample to the tablet 12 for comparison to the device timecode. The synchronization server 28 may be configured to transmit a synchronization message to the tablet 12 in order to submit the available server audio samples and/or the time offset.

Block 92 relates to the application 20 receiving application events from the application server 26 or other device desiring to synchronize operations of the tablet 12 relative to content interface through the television 14. The application events may be associated with any operation capable of being executed through the tablet 12 or with at least partial reliance on operations performed at the tablet 12. The application events may be associated with an event time at which the tablet 12 is to execute the corresponding application event. The application events, particularly when the same application events are to be used with multiple primary and secondary device combinations (e.g., television 14 and tablet 12 combinations of other subscribers), may be scheduled relative to transmission of the content from the television server 22 in that the event time is timed relative to the television server 22. As noted above, the present invention attempts to ameliorate synchronization issues that arise due to time delays, processing delays or other entities associated with the particular primary device (television 14) interfacing the content after the content travels through the various communication means used to deliver the related signaling to the television 14 for interfacing.

Optionally, the event times may be scheduled relative to some other time reference instead of that set by transmission of the corresponding content from the television server 22, such as a world clock or other clock reference. In particular, the present invention contemplates relying on a timing signal or other message to set clocks associated with the tablet 12, television 14, television server 22, synchronization server 28 and/or the application server 26 to a common time reference so that each can execute events at particular intervals of time that are relatively consistent across each clock. Regardless of whether the event times are scheduled relative to content transmission, a coordinated clock schedule or some other time reference, the event time specified by the application server 26 or other entity for each application event may be adjusted in accordance with the present invention to facilitate synchronizing execution relative to content playback in order to compensate for temporal deviations particular to the content.

Block 94 relates to synchronizing execution of the application events relative to the content. The synchronization may be performed by adjusting the event time specified for each application event relative to the time offset. The application 20 executing on the tablet 12 may be configured to perform the event time adjustment in order to achieve the desired synchronization. Once the content is synchronized, and in the absence of an additional temporal influence, the synchronization may be maintained according to the initial time offset such that additional time offset may not necessarily be determined or continuously checked. Block 96 relates to one temporal influence associated with implementing a trick mode. The trick mode may correspond with pausing, fast forwarding, rewinding or otherwise manipulating how content is interfaced through the television 14 in a manner that deviates from how the content was intended for playback as transmitted from the television server 24 or in a manner that disrupts the event time scheduling determined by the application server 22 for the application events. The temporal disruption caused by the trick mode changes the timing of when content is interfaced through the television 14 relative to a previous synchronization such that re-synchronization becomes necessary when playback begins.

Block 98 relates to beginning playback after implementing a trick mode and re-sampling an additional television output, i.e., an additional television audio signal. This may include the tablet 12 capturing the additional television audio sample at the time when trick mode is disengaged or when playback is otherwise re-started. The synchronization server 28 may continue to generate server audio samples while the trick mode is engaged, i.e., the synchronization server 28 may continue to capture server audio samples while playback is paused at the television 14. Block 100 relates to the synchronization server 28 retrieving the server audio samples captured while the trick mode was engaged and thereafter continuing to sample the server audio samples, which are referred to as additional server audio samples. Block 104 relates to one of the tablet 12 and the synchronization server 28 comparing one or more of the additional server audio samples to the additional television audio sample to determine an additional matched sample.

The tablet 12 may notify the synchronization server 28 of a time when the trick mode was implemented in order to identify a portion of the additional server audio samples that may be likely matches to the additional television audio sample, i.e., the search for a match may be accelerated by beginning the comparison relative to additional server audio samples taken proximate in time to when the trick mode was engaged. In the event the synchronization server 28 is unaware of engagement of the trick mode or a location in time at which to begin searching, the search for the matching additional audio sample may begin with the most recent additional server audio sample and work backwards there from to the oldest additional server audio sample.

Block 104 relates to the tablet re-synchronizing application events execution relative to an additional time offset by adjusting or further adjusting the event time for each application event to execute according to the additional time offset. The additional time offset may be based on the tablet 12 and/or the synchronization server 28 calculating timing differences between timecodes associated with the additional television audio sample and the matching one of the one or more additional server audio samples may be calculated. The additional time offset can then be used in place of the previously determined time offset to adjust the event times.

Block 106 relates to the tablet waiting a pre-defined period of time before conducting additional re-synchronization by repeating the initial synchronization processes. The pre-defined period of time may be a design parameter set according to the type of content being access, e.g., teaming content, 3D content or other types of content requiring close synchronization may have shorter delay periods than those requiring less synchronization. The delay may be circumvented in the event a user selects the refresh option on the tablet 12 or the tablet 12 receives a message indicating some other disruption within the system 10, such as but not necessarily limited to network congestion delaying content delivery to the television 14 and/or the television 14 itself experiencing some processing delay or interruption, such as but not necessarily limited to pausing viewing due to emergency alert or other override activity.

Optionally, the present invention contemplates performing the content synchronization without the tablet or other devices in the system capturing audio in a state that the underlying content, vocabulary or context is obfuscated or otherwise irreproducible from at least the tablet audio samples. The unrecognizable form of the tablet audio samples may be useful in ameliorating a need to perform voice recognition or otherwise having to configure devices to recognize the content comprising the audio sample, which can be particularly beneficial in maintaining privacy and preventing the possibility of unintentional use of personal or private audio. The ability to generate the television audio samples and the server audio samples, and to perform the related matching, without audio recognition, i.e., discovering or otherwise retaining useful or content specific information from the recording, may be beneficial in ameliorating processing demands as such attendant recognition processing may be time and resource consuming. One non-limiting aspect of the present invention contemplates performing the matching using techniques that allow the audio samples to be compared to other audio samples without having to recognize the true content of the samples.

As supported above, the present invention contemplates systems and methods for synchronizing applications running on one or more devices with audio and video programming played from a separate viewing device. The contemplated synchronization may include: nearly exact sync granularity, to within 100 ms or better; accomplished without adjusting normal operations of the application server and/or the television server; without necessarily requiring involvement of the set top box; sufficient to support live programming; and supports trick mode, pause and restart. The ability of present invention to maximize the speed at which synchronization can be facilitated may be particularly beneficial in performing synchronization for real-time broadcasts, such as but not limited to live events, where a database of audio samples is unavailable prior to the related transmission or prior to generating the server audio samples. At least one non-limiting aspect of the present invention contemplates performing synchronization by comparing two audio samples to each other, i.e., matching audio samples, without having to perform a time-consuming process for searching a database of previously stored audio samples. Additionally, the present invention contemplates maximizing the speed of synchronization by limiting the amount of searching needed to find matching audio samples, e.g., by limiting the compared audio samples to content known to be interfaced through the television from identifying information provided by the tablet or other content receiving device with knowledge of the content currently interfaced through the television.

In one non-limiting aspect of the present invention, it is assumed that the user tunes his TV to a desired live program, and then starts an application that will synchronize with the live programming being played on the TV. The application begins sampling audio from its microphone (program audio from the TV), and sends a registration message to a Content Sync Server, indicating the program to which the app wishes to synchronize. The Content Sync Server also tunes to that programming from the headend, then extracts the audio from the selected program, sampling the audio in time slices, potentially compresses the audio, and sends the sampled audio to an App running on the device, together with the program timecode for each audio sample. An App may receive in-room audio from the device's mic, and packetized audio with program time codes from the Content Sync Server. The App may then align the two audio streams to match using a simple amplitude or frequency based pattern match algorithm, and pairs the device's "wall clock" with the program's time code. Knowing the delta between the device wall dock and the program time code enables the app to track and stay in tight sync with a live programming by simply using the device wall clock.

The Content Sync Server continues to send the real time program audio samples to the App, so that the App can compare them with the audio samples from the local microphone, to detect loss of synchronization. Once synchronization has been achieved, the App sends a registration to the Application Server, registering for application events associated with the tuned program. The Application Server then sends timed events to the App at the time of occurrence, tagged with the program timecode at the time of occurrence. The App receives the messages and takes the indicated action when its device clock reaches the program time code of the event plus the time code offset. Event synchronization continues in this manner until the user pauses the playback of the program, which may be achieved through an interaction with a set top box or through a command to a network-based video playback server or Content Delivery Network cache. At this point, the App notices a loss of synchronization by comparing the local audio samples to the real time program audio samples it receives from the Content Sync Server. The app may be configured to send a Loss of Sync message to the App Server so that the App Server no longer sends program events to the App, or the App may be configured to allow the App Server to continue to send program events.

If the user resumes watching the program, they could be watching the program "behind" real time, meaning that the user is seeing parts of the program that other viewers that have not paused the programming have already seen. In order to achieve re-synchronization, the App continuously sends packetized local audio samples, together with the local device clock time, over the Internet to the Content Sync Server, and the Content Sync Server attempts to match the audio samples against the entire record of the program that has played, optionally beginning from the portion of the program coinciding with activation of the trick mode to the current time if the beginning of the trick mode is known or available to the Content Sync Server or beginning from the most recent sampling of the Content Sync Server if the beginning of the trick mode is unknown or otherwise unavailable. Once audio samples are matched, the Content Sync server determines the time code offset between the device time and the program time, and sends the time offset back to the App. The App is now re-synchronized with the programming, and can register with the App Server to again receive program events. When the user has resumed playback after a pause and is playing delayed programming, the App continuously sends local audio samples to the Content Sync Server so that the Content Sync Server can detect any further loss of synchronization and can alert the application of a loss of synchronization. The App can react to Sync Loss Alert or Resync messages received from the Content Sync Server by optionally alerting the App Server to stop or resume sending Program Events from a specified program timecode.

Another variant contemplated by the present invention for the way this system and method can be implemented does not involve the delivery of full audio samples across the network between the Content Sync Server and the Device Application. This may include, instead of sending the complete audio stream from the content sync sever to the app in the device, the content sync app server could derive a signature from the audio and send a derivative of the audio stream for matching in the device. Examples include: sending only a vector of audio amplitude for each time slice; sending only a vector of frequency patterns for each time slice, e.g., a midpoint and frequency range of the audio sampled for a time slice; sending on the audio watermarks detected in the program audio; and/ or sending only periodic audio samples or fingerprints. Additionally, the Content Sync Server can derive more than audio and audio related information from the program, such as signaling information and relay that to the Device Application.

The present invention could also have utility as an aid to "check-in applications" such that the check-in applications could operate without having to take a short audio sample and send it to a network-based server for the server to match it against a pre-constructed database of audio samples due to an inability of such servers to know what the user is watching at any given time. This invention may allow the check-in application to know what is being watched at any given time since, if the user is watching programming in real time, the application will often be in close synchronization with the programming without having to send new audio samples to the Content Sync Server. When a user is using a check-in application, the application can simply check to see that the local programming is synchronized with a known program stream and can confirm that the user is watching a particular program or advertisement, without needing to do a new, remote audio match.

In one non-limiting aspect of the present invention, the initial audio sample matching is performed in the device application itself, and is not based upon a database of fingerprints. Instead, the audio sample matching is performed in real time based on samples derived from the program at the headend and for the same program in the room with the television. The audio sample and timecode matching can achieve synchronization granularity as low as the audio sample size. That is, if there are 100 audio samples per second, then synchronization can be on the order of 1/100th of a second. Also, in this technique, content identification can be achieved on the local device without the long latencies associated with sending an audio sample to a network server, waiting for a match and a response message. With this invention, the identity is often already known, so there does not need to be a step of "figuring out what is being watched" when the user wants either take advantage of synchronized app experiences or perform a check-in.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of synchronizing application content interfaced through a device with television content interfaced through a television, the television being configured to emit television audio to a surrounding area when interfacing the television content, the device being remotely positioned within the surrounding area and configured to sample the television audio as emitted from the television, the television content being provided to the television from a television server, the application content being provided to the device from an application server, the method comprising:
    determining a television audio sample sampled by the device, the television audio sample reflective of audio associated with the television content as emitted from the television within the surrounding area;
    determining a device timecode for the television audio sample, the device timecode indicating a television sampling time at which the device sampled the television audio sample;
    determining a server audio sample matching the television audio sample, the server audio sample reflective of audio associated with the television content as transmitted from the television server for use with the television;
    determining a server timecode indicating a server sampling time at which the server audio sample was sampled;
    calculating a time offset between the device timecode and the server timecode;
    synchronizing application content interfaced through the device according to the time offset;
    determining output of the television content to be behind real time, and thereafter, re-synchronizing the application content interfaced through the device, including:
    comparing an additional television audio sample sampled with the device to one or more additional server audio samples sampled prior to sampling of the additional television audio sample;
    determining the one of the one or more additional server audio samples matching with the additional television audio sample;
    calculating an additional time offset corresponding with a timing difference between a device timecode of the additional television audio sample and a server timecode of the matching one of the one or more additional server audio samples; and
    re-synchronizing application content interfaced through the device based at least in part on the additional time offset.

2. The method of claim 1 further comprising determining the server audio sample to be one of a plurality of server samples sampled from the television content transmitted from the television server for use with the television.

3. The method of claim 2 further comprising determining the server audio sample to be the one of the plurality of server samples having an audio signature most closely matching with an audio signature of the television audio sample.

4. The method of claim 2 further comprising facilitating sampling of the plurality of server samples by facilitating tuning to a television program broadcast associated with the television audio sample.

5. The method of claim 4 further comprising identifying the television program broadcast from an identifier determined by one of the television and the device.

6. The method of claim 1 further comprising transmitting a registration message to the application server to register for application events, the application events comprising at least a portion of the application content interfaced through the device.

7. The method of claim 6 further comprising receiving a plurality of application events from the application server, the plurality of application events each specifying an event time during which the corresponding application event is to be interfaced through the device, wherein synchronizing the application content includes adjusting the event time for one or more of the plurality of application events according to the time offset.

8. The method of claim 7 further comprising adjusting the event time such that one or more of the application events occur at least one of before, at and after the event time specified for the corresponding application event.

9. The method of claim 1 further comprising determining the television audio sample as a derivative of the audio emitted from the television.

10. The method of claim 9 further comprising determining the derivative to be at least one of an amplitude pattern, a frequency pattern, a watermark and a fingerprint of the audio emitted from the television.

11. A content synchronization server comprising:
    a tuner to tune to television content transmitted from a television server to a television;
    a sampler to generate one or more server audio samples from audio carried within the tuned to television content, the server audio samples reflective of audio associated with the television content as transmitted from the television server;
    an interface to facilitate communicating with a device positioned within an audio range of the television, the interface being configured to receive a television audio sample sampled by the device, the television audio sample reflective of audio associated with the tuned to television content as emitted from the television;
    a comparator to identify a matched audio sample, the matched audio sample being the one of the server audio samples most closely matching with the television audio sample;
    a timer to determine timecodes for the matched audio sample and the television audio sample, and based thereon, to determine a time offset reflective of a timing difference between when the television content is transmitted to the television and when the television content is output from the television;
    a synchronization controller to communicate a synchronization message to the device suitable for use by the device in synchronizing output of application content relative to the television content output from the television, the application content being synchronized by the device based on the time offset being specified in the synchronization message;
    wherein the synchronization controller communicates a re-synchronization message to the device in the event the television is controlled according to a trick mode, the re-synchronization message suitable for use by the device in re-synchronizing output of application content relative to an additional time offset resulting from the trick mode.

12. The content synchronization server of claim 11 further comprising:
a server clock;
wherein the timer is configured to determine the timecode for the matched audio sample based on a time registered by the server clock; and
wherein the timer is configured to determine the timecode for the television audio sample as a result of information transmitted with the television audio sample, the information being based on a time determined by a device clock of the device.

13. The content synchronization server of claim 11 wherein the interface is configured to receive a tuning message from the device, the tuning message indicating a television channel tuned to by the television, the television channel identifying the television content transmitted from the television server to the television, wherein the tuner tunes to the television channel to facilitate sampling of the one or more server audio samples.

14. The content synchronization server of claim 11 wherein:
the comparator is operated to:
i) compare an additional television audio sample sampled with the device to one or more additional server audio samples, the additional television audio sample being sampled by the device after the television audio sample, the additional server audio samples being sampled prior to sampling of the additional television audio sample;
ii) identify an additional matched audio sample, the additional matched audio sample being the one of the additional server audio samples most closely matching with the additional television audio sample; and
the timer is configured to determine the additional time offset as a function of a timing difference between a timecode of the additional television audio sample and a timecode of the additional matched audio sample.

15. A computer program product for processing content, the computer program product being embodied in a non-transitory computer readable storage medium and comprising computer instructions sufficient for:
comparing a first audio sample with at least a plurality of second audio samples, the first audio sample being of audio as emitted from a first source interfacing content streamed from a second source, the second audio samples being of audio as emitted from the second source to the first source;
identifying a matched audio samples as a one of the second plurality of audio samples most closely matching the first audio sample; and
determining a timing difference between the first audio sample and the matched audio sample;
synchronizing events executing on a device based on the timing difference;
comparing a third audio sample of audio as emitted from the first source interfacing the content streamed from the second source with one or more of a plurality of fourth audio samples of audio as emitted from the second source to the first source, the third audio sample being sampled by the device after the first audio sample is compared with the plurality of second audio samples, the plurality of fourth audio samples audio samples being recorded prior to the third audio sample;
identify an additional matched audio sample, the additional matched audio sample being the one of the plurality of fourth audio samples most closely matching with the third audio sample;
determining an additional timing difference between the third audio sample and the additional matched audio sample; and
re-synchronizing events executing on the device based on the additional timing difference.

16. The computer program product of claim 15 further comprising computer instructions sufficient for:
identifying an event time for each of the events to be synchronized, each event time specifying a time at which the corresponding event is to execute; and
synchronizing the events by adjusting the event time for one or more events by an amount approximating the timing difference.

17. The computer program product of claim 15 further comprising computer instructions sufficient for:
capturing the first audio sample with the device;
identifying the content being streamed to the first source from user inputs to the device; and
transmitting a request message sufficient for requesting the plurality of second audio samples, the request message identifying the content being streamed to the first source.

* * * * *